(No Model.)
L. S. MANNING.
DOOR FOR CAR PLATFORMS.
No. 515,602. Patented Feb. 27, 1894.
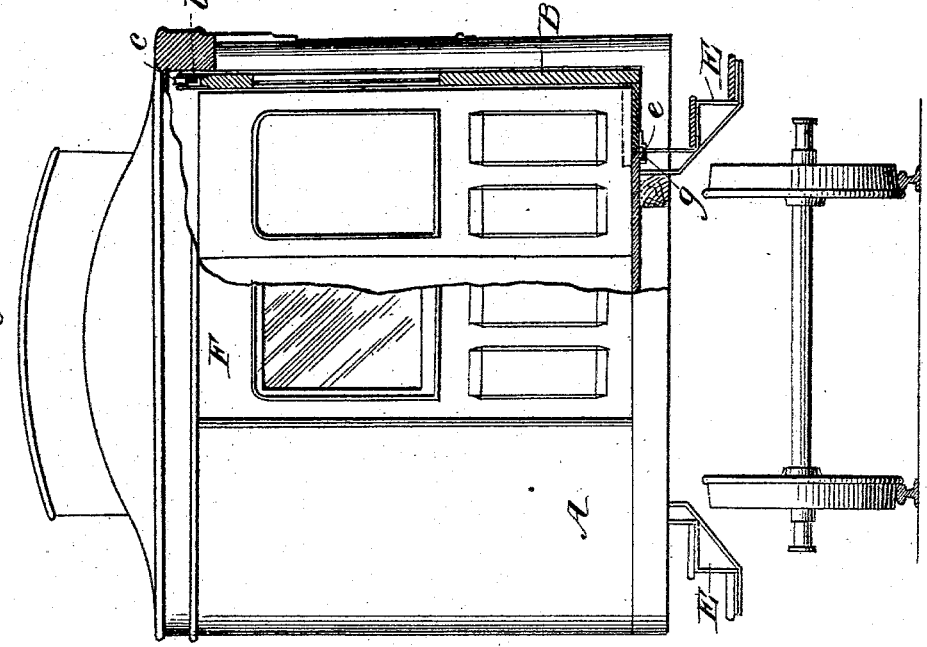
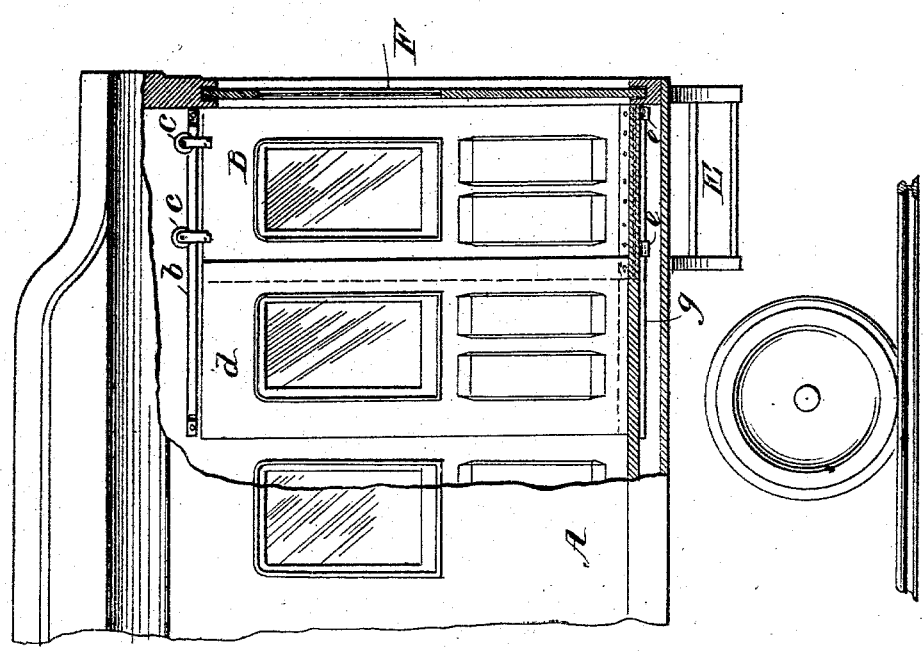
WITNESSES:
INVENTOR
L. S. Manning
BY Munn & Co
ATTORNEYS.

(No Model.)　　　　　　　　　　　　　　　　　　2 Sheets—Sheet 2.
L. S. MANNING.
DOOR FOR CAR PLATFORMS.
No. 515,602.　　　　　　　　　　　　　Patented Feb. 27, 1894.
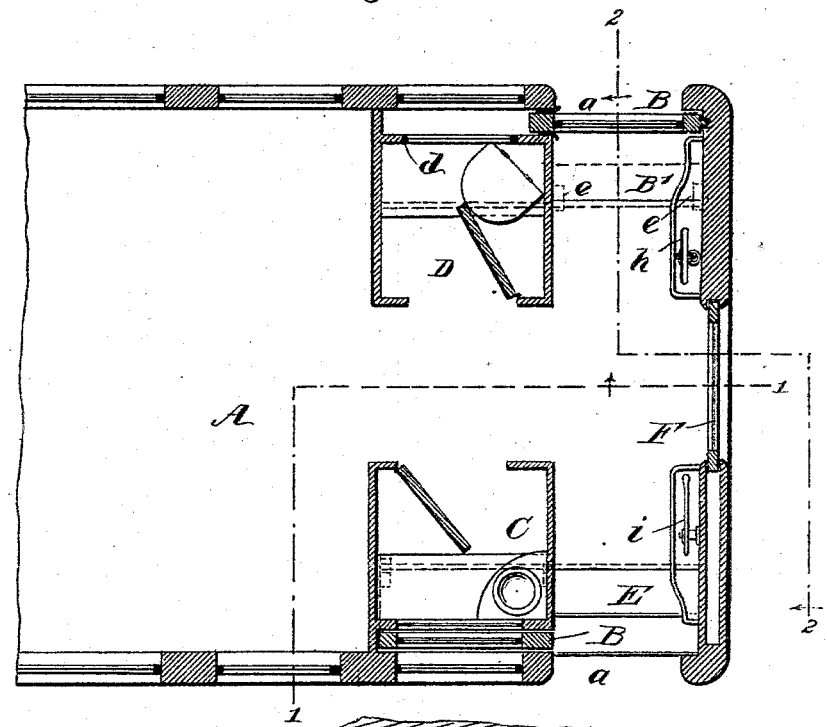
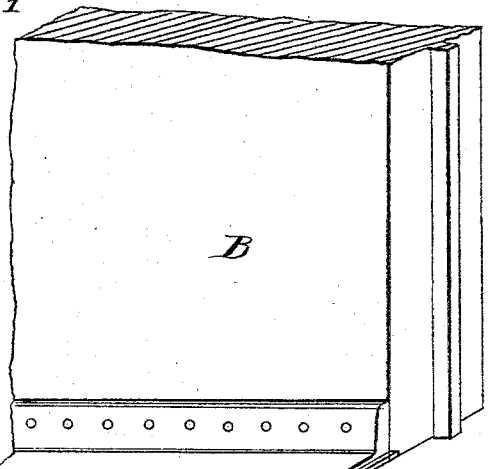
WITNESSES:　　　　　　　　　　　　　　　　INVENTOR
Paul Jahn　　　　　　　　　　　　　　　　　L. S. Manning
C. Sedgwick　　　　　　　　　　　　　　　BY
　　　　　　　　　　　　　　　　　　　　　Munn & Co
　　　　　　　　　　　　　　　　　　　　　ATTORNEYS.

UNITED STATES PATENT OFFICE.

LEMUEL S. MANNING, OF ALESSANDRO, CALIFORNIA.

DOOR FOR CAR-PLATFORMS.

SPECIFICATION forming part of Letters Patent No. 515,602, dated February 27, 1894.

Application filed September 4, 1893. Serial No. 484,749. (No model.)

*To all whom it may concern:*

Be it known that I, LEMUEL S. MANNING, of Alessandro, in the county of San Bernardino and State of California, have invented new and useful Improvements in Railroad-Car Bodies and Doors Therefor, of which the following is a full, clear, and exact description.

My invention relates to improvements in the bodies and doors of railroad passenger cars, and particularly to such cars as are furnished with vestibules.

The object of my invention is, to provide an improved construction for the car body and car doors, to adapt said doors to furnish guards for the floor openings at the car steps that are located at the sides in the body of the car near its ends, and thereby facilitate the safe, convenient entrance of passengers within the car, and exit from it; the floor of the car being rendered intact, by a feature of the improvement, when the side car doors are shut, and the step passages automatically opened when the doors are similarly adjusted.

To these ends, my invention consists in the construction and combinations of parts, as is hereinafter described and claimed.

Reference is to be had to the accompanying drawings forming a part of this specification, in which similar letters of reference indicate corresponding parts in all the figures.

Figure 1 is a side view of a passenger car having the improvements, and broken away on the line 1—1 in Fig. 3. Fig. 2 is an end view of the car shown in Fig. 1, broken away on the line 2—2 in Fig. 3, showing features of improvement. Fig. 3 is a sectional plan view of a car end portion, and the improvements in place on it; and Fig. 4 is an enlarged perspective view of details of construction, showing the improvements in part.

In the drawings, A indicates the body of a passenger car near one end, and as represented, it is oppositely apertured in the side walls near the end wall, to provide main door openings *a*. The doors B, that are furnished to close the openings *a* are preferably glazed to correspond with the windows in the sides of the car body, and are each hung from a similar track bar *b*, that is horizontally secured above the door it supports, to receive the traveler wheels *c*, that are pivoted on bracket arms which are attached to the upper edge of the door, so that the latter may be laterally moved to open or close the aperture *a* that it guards. A pocket is provided to receive each door and loosely incase it when said door is slid to open a free passage into and out of the car at each side; this being effected by the erection at each side, of a spaced wall *d*, that is parallel with the side wall of the car body, and sufficiently removed from it to afford a cavity of proper dimensions to receive the door, as indicated clearly in Fig. 3, the doors being sealed at the joints where they enter the pockets, by gum strips or like means, and at the opposite side edges have tongue and groove connections with the front wall of the car body, so as to effectually exclude dust when the doors are shut.

The usual lavatory and water closets C, D, are provided, and the casing walls *d* form one side of each of said closets, a window being placed in each casing wall opposite the window at this point in the outer side wall of the car body so that light may enter the closets whether the doors B are shut or open.

There is a rectangular aperture cut in the floor of the car body opposite each entrance aperture *a*, to afford access to the flights of steps E, that are placed and secured at each side of the car below one of the side doors B and beneath the body A, as shown in Fig. 2. If not temporarily closed, the openings cut in the car floor to permit the use of the steps E, would be dangerous to occupants of the car, and would also allow the entrance within the car of dust, and air drafts.

To effect the automatic closure of the openings in the car floor above the steps, when the doors B are closed, there is an apron B', provided for each step opening, which apron is substantially attached to the inner side and lower end of each door B, so as to project inwardly at a right angle therefrom. The dimensions of each apron B', are such as will adapt it to entirely close the step opening in the car floor when the door it projects from is in closed adjustment, and when the doors B are open, the aprons slide below a part of the floor in the closets C, D, that is higher than the floor of the car.

To seal the joints around the aprons B', they are arranged to form a tongue and groove connection at their edges with the mating edges of the openings they slide over, so that dust and the elements are effectively excluded when the doors B are shut. To further stiffen the connection of the edges of the aprons which are parallel with the doors B, and also to support the lower edges of the latter when they are closed, there are a suitable number of bracket hooks e, provided for each apron, and secured at intervals on its lower side, so as to project from the edge that is parallel with the door, which hooks are arranged to loosely engage with the depending ledge g, that projects below the floor at the edge produced on it by the formation of the step opening or passage in said floor; the hooked engagement of the parts mentioned, serving to hold the apron up closely against the floor edge, and prevent the outward movement of the door B, if pressed against from within, when closed.

As shown in Fig. 3, there is a door F, introduced in the end wall of the car body as usual, to allow a free passage from one car to another over a short platform, (not shown) below a protecting vestibule on each car end, (also omitted from the drawings) and in the same figure it will be seen that the brake controlling device h, and car-coupling release lever i, are located on the end wall of the car within the car body, so as to be readily operated from within the car.

It is claimed for the improved features that have been described, that safe and easy access is afforded directly into the car at each end from either side, and that a neat, simple and practical construction is afforded, whereby the doors are made to automatically close the step openings or passages into the car when the doors are shut, and simultaneously open said passages when the latter are slid to open the way into the car at its sides.

Having thus fully described my invention, I claim as new and desire to secure by Letters Patent—

1. The combination with a passenger car body apertured at the side and in its floor near the end, of pendent slidable doors, and an inwardly projecting apron on each door near its lower edge, substantially as described.

2. The combination with a passenger car body apertured at the sides and in its floor near the end, of steps below the floor apertures, pendent slidable doors arranged to close the door apertures, and an apron inwardly projected from each door near its lower end and adapted to close the floor apertures when the sliding doors are closed, substantially as described.

3. The combination with a passenger car body apertured at the sides, and in the floor near the end, and car steps hung below the floor apertures, of pendent doors arranged to slide, an inwardly projecting apron secured at the lower end of each door, and means to seal the joints of said aprons when closed, substantially as described.

4. The combination with a passenger car body apertured at the sides and in the floor near the end, and car steps hung below the floor apertures, of pendent doors arranged to slide, an inwardly projecting apron secured at the lower end of each door, and adapted to close the floor apertures when the doors are adjusted to seal the side apertures, and hook brackets on the aprons, that have a sliding engagement with depending ledges on the floor at the margins of the floor apertures that are opposite the doors, substantially as described.

LEMUEL S. MANNING.

Witnesses:
EDWARD M. CLARK,
F. W. HANAFORD.